US008611236B2

(12) United States Patent
Nakamura et al.

(10) Patent No.: US 8,611,236 B2
(45) Date of Patent: Dec. 17, 2013

(54) COMMUNICATION CHECKER, COMMUNICATION-STATE DETECTION SYSTEM AND METHOD FOR CHECKING COMMUNICATION STATE

(75) Inventors: Akihiko Nakamura, Otsu (JP); Eiji Fujikawa, Yokosuka (JP); Shinichi Mukaigawa, Kyoto (JP)

(73) Assignee: Omron Corporation, Kyoto-shi (JP)

( * ) Notice: Subject to any disclaimer, the term of this patent is extended or adjusted under 35 U.S.C. 154(b) by 981 days.

(21) Appl. No.: 12/060,646

(22) Filed: Apr. 1, 2008

(65) Prior Publication Data

US 2008/0247328 A1     Oct. 9, 2008

(30) Foreign Application Priority Data

Apr. 3, 2007     (JP) .................................. 2007-097811

(51) Int. Cl.
*H04L 12/26*     (2006.01)

(52) U.S. Cl.
USPC ......................................................... 370/252

(58) Field of Classification Search
USPC ......................................... 370/252, 329, 337
See application file for complete search history.

(56) References Cited

U.S. PATENT DOCUMENTS

| | | | |
|---|---|---|---|
| 5,724,346 A * | 3/1998 | Kobayashi et al. ............ 370/329 |
| 6,185,435 B1 * | 2/2001 | Imura .......................... 455/552.1 |
| 7,016,707 B2 * | 3/2006 | Fujisawa et al. ............... 455/567 |
| 7,184,707 B2 | 2/2007 | Tada et al. | |
| 7,295,860 B2 | 11/2007 | Suwa | |
| 7,660,581 B2 * | 2/2010 | Ramer et al. ................ 455/432.3 |
| 2004/0117481 A1 * | 6/2004 | Arimoto et al. ................ 709/224 |
| 2005/0059391 A1 * | 3/2005 | Ikeda et al. ................. 455/426.2 |
| 2005/0093702 A1 | 5/2005 | Twitchell, Jr. | |
| 2006/0208742 A1 * | 9/2006 | Tsudaka et al. ................ 324/532 |
| 2007/0044025 A1 * | 2/2007 | Sakamoto ..................... 715/734 |
| 2008/0299948 A1 * | 12/2008 | Rosener ..................... 455/412.2 |

FOREIGN PATENT DOCUMENTS

| | | |
|---|---|---|
| CN | 1539213 | 10/2004 |
| EP | 1 137 240 | 9/2001 |
| JP | 2001-168783 | 6/2001 |
| JP | 2002-027019 | 1/2002 |
| JP | 2004-214875 A | 7/2004 |
| JP | 2004-280793 | 10/2004 |
| JP | 2006-093778 | 4/2006 |
| JP | 2006-100884 | 4/2006 |
| WO | WO-02/087205 | 10/2002 |
| WO | WO-2006/016001 | 2/2006 |

OTHER PUBLICATIONS

Sung-Nien Yu et al., "A Wireless Physiological Signal Monitoring System with Integrated Bluetooth and WiFi Technologies," Engineering in Medicine and Biology Society, 27th Annual Conference, Proceedings of the 2005 IEEE, pp. 2203-2206.

* cited by examiner

*Primary Examiner* — Mark Rinehart
*Assistant Examiner* — Mohammad Anwar
(74) *Attorney, Agent, or Firm* — Foley & Lardner LLP

(57) ABSTRACT

A simple-structure communication checker capable of detecting the communication state of devices communicating in different communication methods is provided. The communication checker includes an SLPR communication detector that detects the communication state through the SLPR service and a FOMA communication detector that detects the communication state through the FOMA service.

12 Claims, 4 Drawing Sheets

COMMUNICATION CHECKER, COMMUNICATION-STATE DETECTION SYSTEM AND METHOD FOR CHECKING COMMUNICATION STATE

This application claims priority from Japanese Patent Application 2007-097811, filed on Apr. 3, 2007. The entire content of the aforementioned application is incorporated herein by reference.

BACKGROUND OF THE INVENTION

1. Field of the Invention

This invention relates to a communication checker for checking the wireless communication state between devices, a communication-state detection system and a method for checking the communication state, more particularly, to a communication checker for checking the communication state of a master unit communicating with a plurality of slave units or the slave units, a communication-state detection system and a method for checking the communication state.

2. Description of the Related Art

FIG. 6 is a block diagram showing a structure of a wireless communication system. By referring to FIG. 6, this wireless communication system includes slave units 30a to 30c that are connected to a predetermined measuring instrument and transmits the data from the instrument, a master unit 20 that receives the data transmitted from the slave units 30a to 30c, and a management server 40 that manages the data transmitted from the master unit 20. The communication between the slave units 30a to 30c and the master unit 20 can be conducted through specified low power radio (hereinafter referred to as "SLPR") service, while the communication between the master unit 20 and the management server 40 is conducted through Freedom of Mobile Multimedia Access (hereinafter referred to as "FOMA") (trademark, the rest is omitted) service, which is a mobile cellular telecommunication system. Thus, the master unit 20 includes an SLPR communication unit 21 to use the SLPR service and a FOMA communication unit 22 to use the FOMA service.

Such a communication system using the different communication services requires the master unit 20 to be installed at a position where both services deliver high-performance communication.

Conventional apparatuses for evaluating the communication state in wireless communications are disclosed in, for example, Japanese unexamined patent publication Nos. 2004-280793 and 2001-168783. Publication No. 2004-280793 discloses a method in which a personal computer evaluates the strength of signals transmitted from wireless computer peripheral devices.

Alternatively, publication No. 2001-168783 discloses an apparatus for checking an error rate to readily locate an installation site for a repeater that makes up a network.

There are not any other methods for detecting communication states except for the techniques, as described above, which cannot readily detect positions where both the services deliver high-performance communication with the communication system as shown in FIG. 6, thus involving a difficulty in determining where the master unit ought to be set up.

SUMMARY OF THE INVENTION

The present invention is made in view of the above problem and has an object to provide a communication checker and communication-state detection system capable of readily locating an installation site for devices using different communion services.

The communication checker according to the present invention includes a first detector that detects the communication state in a first wireless communication method, and a second detector that detects the communication state in a second wireless communication method which is different from the first wireless communication method.

In a wireless communication system using two different communication methods, the communication checker capable of detecting the communication states in both the first wireless communication method and the second wireless communication method which is different from the first wireless communication method can readily locate a site desired for communication.

Preferably, the communication checker checks the communication state at a site where a master unit communicating with a plurality of slave units and a management server is planned to be installed. The master unit and the slave units communicate with each other in the first wireless communication method, while the master unit and the management server communicate with each other in the second wireless communication method.

The first wireless communication method may be the specified low power radio service, and the second wireless communication method may be a wireless service using a cellular phone communication network.

The communication checker can be incorporated in the master unit or can be installed alone.

The communication checker can include an automatic communication-state checker for automatically checking the communication states and manners with the plurality of slave units and management server.

According to another aspect of the present invention, in a communication-state detection system using the above-described communication checker, the master unit is connected to the management server through the second wireless communication method, and the management server stores the communication states, which are detected by the communication checker, between the plurality of slave units and master unit communicating in the first wireless communication method. The communication-state detection system includes a network accessible through the second wireless communication method and a mobile terminal accessible to the network. The mobile terminal can access to the management server via the network to check the communication states between the plurality of slave units and master unit communicating in the first wireless communication method.

Preferably, the communication checker detects only the communication state in the first wireless communication method and second wireless communication method. The mobile terminal has a display to display the communication state in the first wireless communication method and second wireless communication method.

In another aspect of the present invention, a method for checking communication states at a site where a master unit communicating with a plurality of slave units and a management server is planned to be installed includes a step of detecting the communication state with the slave units in the first wireless communication method by a communication checker at a site where the master unit is planned to be installed, and a step of detecting the communication state with the management server in the second wireless communication method by the communication checker at the site where the master unit is planned to be installed. The second wireless communication method is different from the first wireless communication method.

Preferably, the method further includes a step of storing the communication states, between the plurality of slave units and master unit communicating in the first wireless communication method, detected by the communication checker in the management server, and a step of allowing a mobile terminal to access the management server via a network to check the communication states between the plurality of slave units and master unit communicating in the first wireless communication method.

DETAILED DESCRIPTION OF THE PREFERRED EMBODIMENT

Figure 1:
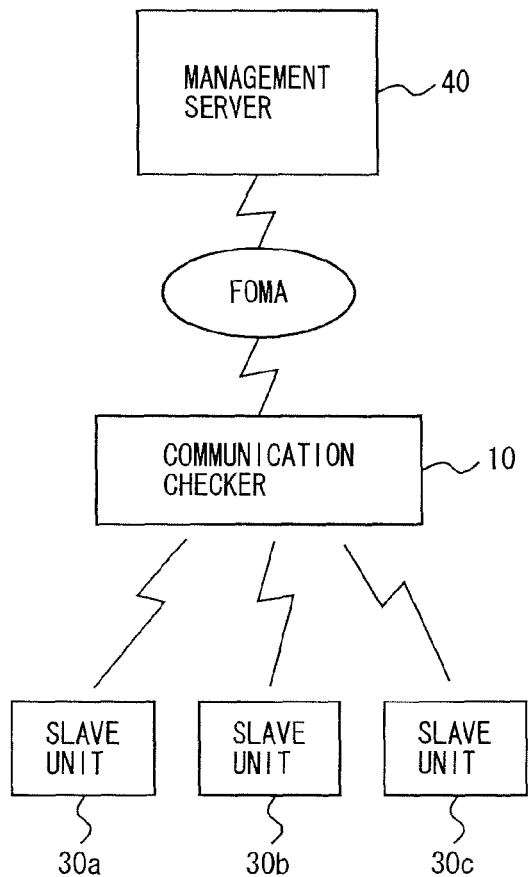
FIG. 1 is a block diagram showing the entire structure of a wireless communication system according to an embodiment of the invention.
Figure 6:
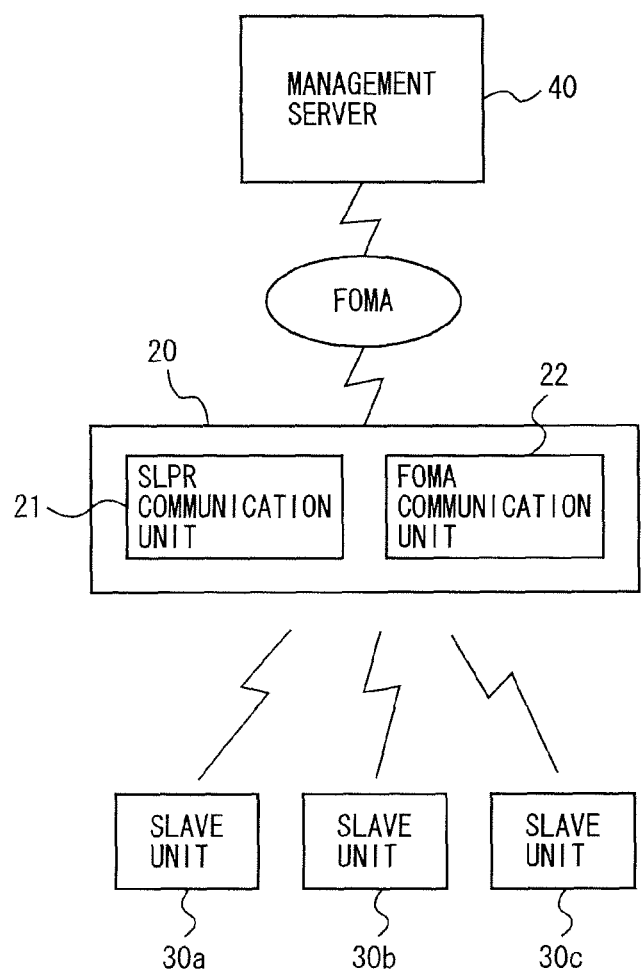
FIG. 6 is a block diagram showing the entire structure of a conventional wireless communication system.

An embodiment of the present invention will be described below with reference to the drawings. FIG. 1 is a block diagram showing the structure of a wireless communication system in which a communication checker according to the embodiment is used, and corresponds to FIG. 6 described in Background Art. Referring to FIG. 1, the wireless communication system in this embodiment includes a communication checker 10 placed at a site corresponding to the site where the master unit is installed in FIG. 6. The communication checker 10 can check the communication state via both the SLPR service and FOMA service and locate a site desired for both the communication services.

Figure 2:
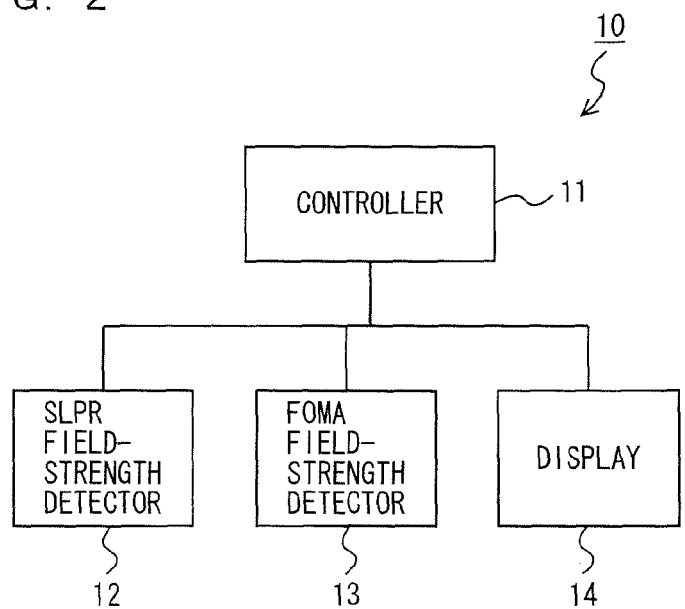
FIG. 2 is a block diagram showing the structure of a communication checker.

FIG. 2 is a block diagram showing the structure of the communication checker 10. Referring to FIG. 2, the communication checker 10 includes a controller 11 that controls the entire communication checker 10, an SLPR field-strength detector (first detector) 12 that detects the electric field strength of radio waves through the SLPR service (first wireless communication method), a FOMA field-strength detector (second detector) 13 that detects the electric field strength of radio waves through the FOMA service (second wireless communication method), and a display 14 that displays the electric field strength detected by the SLPR field-strength detector 12 and FOMA field-strength detector 13.

The communication checker 10 enables simultaneous detection of the electric field strength of the radio waves through the FOMA service and the SLPR service at the site where the master unit 20 is supposed to be installed, and therefore the installation site of the master unit 20 can be readily determined.

Figure 3:
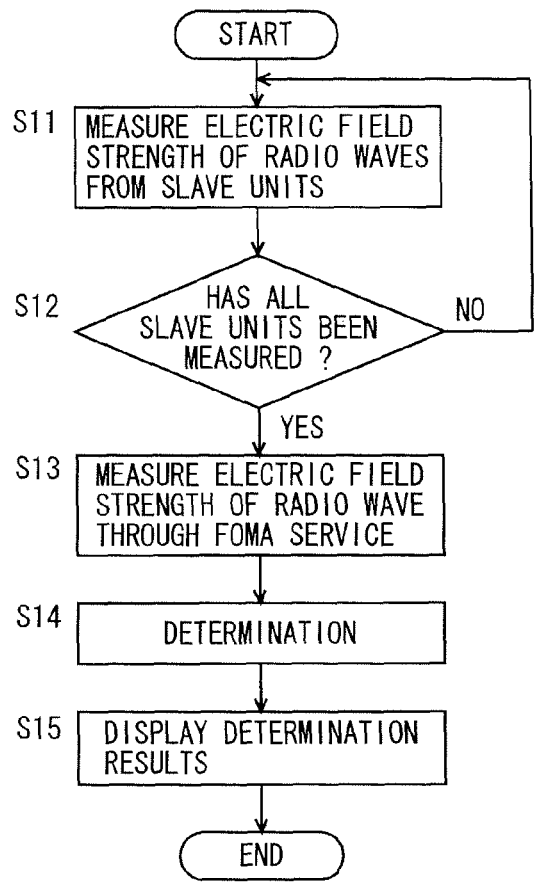
FIG. 3 is a flow chart showing the operation of the controller of the communication checker.

Next, a description will be made about the process of detecting the electric field strength by the communication checker 10. The detection process can be started by operating a switch on the communication checker 10 or upon receipt of a start-up instruction transmitted through communication channels. The communication checker 10 has information, such as the number of the slave units and IDs, registered therein in advance. FIG. 3 is a flow chart showing the procedural steps of the detection process of the electric field strength performed by the controller 11. Referring to FIG. 3, the communication checker 10 operates the step to sequentially detect the electric field strength of radio waves from the slave units 30a to 30c communicating through the SLPR service (step S11, hereinafter "step" is omitted). After the electric field strength of all slave units is detected ("YES" in S12), detection of electric field strength of radio waves from the management server 40 through the FOMA service is performed (S13). Upon completion of all detecting operations, the communication checker 10 makes determination based on the detected results (S14), and the determination results are displayed on the display 14 (S15).

In the case where the communication checker 10 detects reduction of the electric field strength during communication with the slave units, the communication checker 10 can issue an alarm or display the detected results on the display 14.

Next, a description will be made about the method for determining the installation site shown in S14. First, the slave units 30a to 30c are set up at predetermined sites. Next, the communication checker 10, situated at a place where the master unit 20 is planned to be set up, checks the electric field strength (communication level) of radio waves from each of the slave units 30a to 30c communicating through the SLPR service and from the management server 40 communicating through the FOMA service. Specifically, the communication checker 10 detects the electric field strength of the radio waves from the slave units 30a, 30b and 30c, in this order, through the SLPR service, and then switches to the FOMA service to detect the electric field strength of radio waves from the management server 40. Subsequently, the position of the master unit is determined according to Table 1 shown below.

TABLE 1

|  | Site A | Site B | Site C | Site D |
| --- | --- | --- | --- | --- |
| SLPR service | FAIL | PASS | FAIL | PASS |
| FOMA service | FAIL | FAIL | PASS | PASS |
| Determination | FAIL | FAIL | FAIL | PASS |

In Table 1, "PASS" in the field of the services denotes that the electric field strength through the service exceeds a predetermined threshold, while "FAIL" denotes that the strength does not reach the threshold. On the other hand, "PASS" in the field of determination denotes that the master unit 20 can be installed at the site without problems, while "FAIL" denotes that the master unit 20 should not be installed at the site. Only when the site has no problem in communication through both the SLPR service and FOMA service, as shown in Table 1, it is determined that the master unit 20 can be installed at the site.

Although, in this embodiment, the evaluation of the communication state and the determination of the installation site are made on a two-scale with the threshold, as an example, the present invention is not limited thereto. The evaluation can be made through a scale of three, such as A, B and C, or can be made with the values of the electric field strength as they are.

Although, in the above embodiment, the communication checker 10 measures the electric field strength of radio waves emitted from each of the slave units 30a to 30c as an example, the present invention is not limited thereto; the communication checker 10 can transmit an inquiry signal to each of the slave units 30a to 30c and receive responses from the slave units 30a to 30c. Alternatively, the communication checker 10 can be provided with an automatic communication-state checking device that automatically checks the communication states and manners with the plurality of slave units and with the management server 40. In this case, the controller 11 serves as an automatic communication-state checker together with the SLPR field-strength detector 12 and FOMA field-strength detector 13.

Based on the displayed results, it is possible to relocate the slave unit or master unit whose electric field strength failed to reach the predetermined threshold, thereby readily setting the position of the slave units and the master unit.

Figure 4:
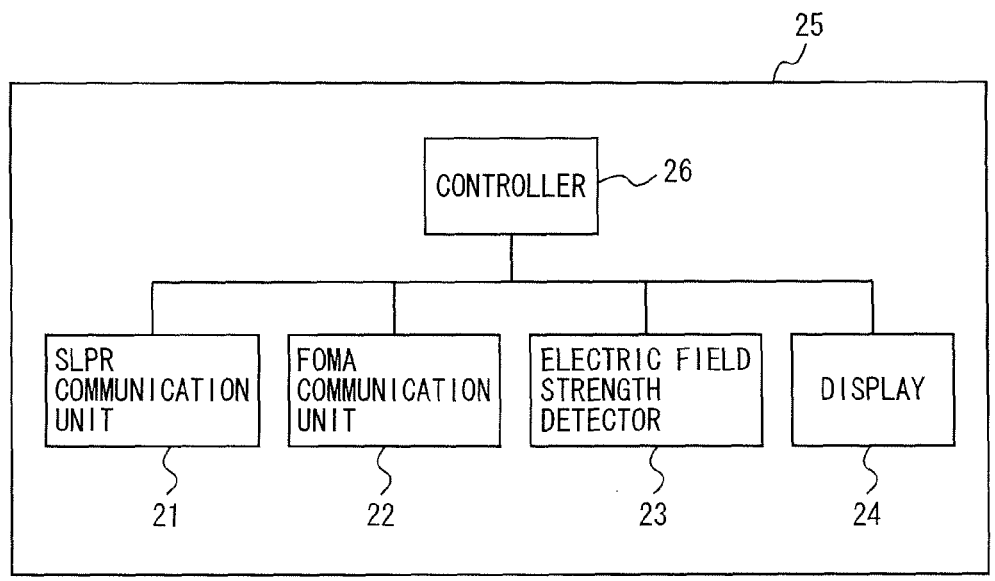
FIG. 4 is a block diagram showing the entire structure of a master unit according to an embodiment of the invention.

Next, another embodiment of the present invention will be described. Although the communication checker 10 is used as a single unit in the above embodiment, the present invention is not limited thereto; the communication checker 10 can be incorporated in the master unit 20. The structure of a master unit 25 having the function of the communication checker is illustrated in a block diagram of FIG. 4. Referring to FIG. 4, the master unit 25 includes, in addition to an SLPR communication unit 21 and a FOMA communication unit 22, an electric field strength detector 23 that is functionally the same as the communication checker 10, in other words, that can detect the electric field strength of radio waves through both the SLPR service and FOMA service, a display 24 that displays the communication results, and a controller 26 that controls the entire master unit 25.

As with the above embodiment, the controller 26 of the master unit 25 can automatically detect the electric field strength of a plurality of slave units 30a to 30c and management server 40 to determine the installation site for the master unit 25 or slave units 30a to 30c.

Figure 5A:
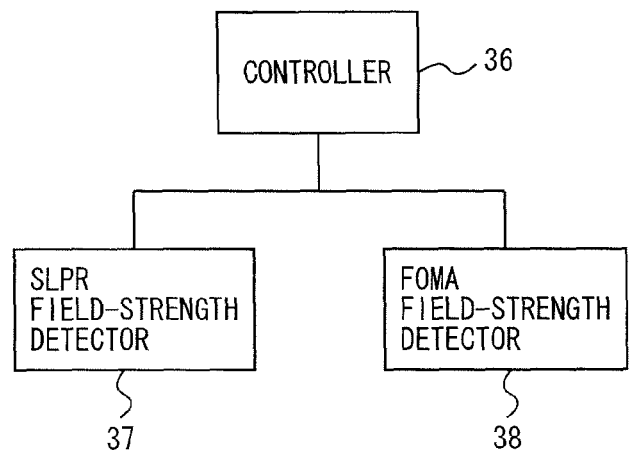
FIG. 5 is a block diagram showing another embodiment of the present invention.
Figure 5B:
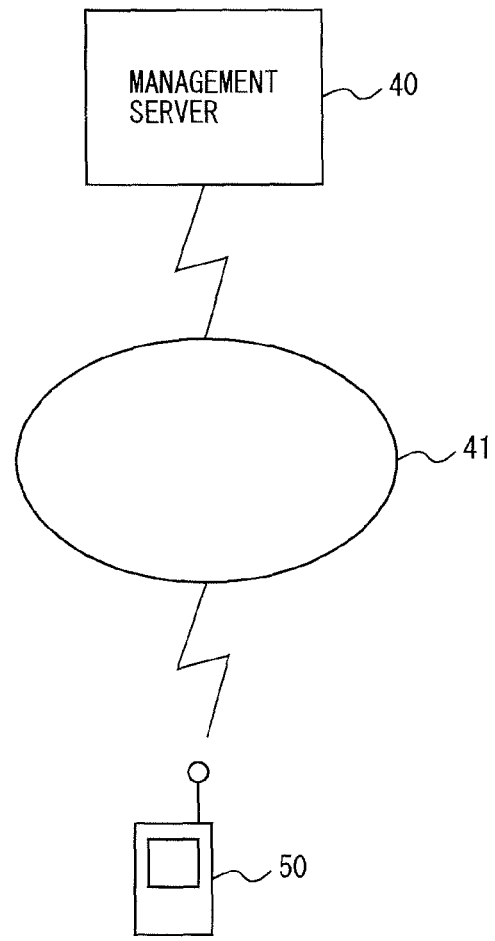

Next, yet another embodiment of the present invention will be described. In this embodiment, the electric field strength detected by the communication checker is used via the management server 40. FIG. 5 illustrates the embodiment of the present invention. FIG. 5A is a block diagram showing the structure of a communication checker 35 in the embodiment, while FIG. 5B illustrates a method for checking the electric field strength by the communication checker 35. The communication checker 35 in this embodiment is not provided with a display but uses a display of a cellular phone connected to the management server 40 through the FOMA service as a substitute of the display of the communication checker.

Referring to FIG. 5B, in this embodiment, the management server 40 is connected to a network like the Internet 41 and is accessible by an external cellular phone 50 or other communication tools. The connected relationship of the management server 40, slave units 30a to 30c and communication checker 35 is shown in FIG. 1.

As the communication checker 35 that is temporarily placed at a candidate site for the master unit installation is turned on, the process shown in FIG. 3 is executed. Then, the detection data obtained from the communication between the communication checker 35 and the slave units 30a to 30c and the communication between the communication checker 35 and the management server 40 are held in the management server 40, and the detection data is available to view on the display screen of the cellular phone 50. It is also possible to display only the determination results without displaying the detected data in process.

The cellular phone can be a mobile terminal such as a PDA (Personal Data Assistant) but must have Internet access.

The embodiment, described above, allowing the detected data to be viewed by using a cellular phone over the FOMA service network accessible to the Internet 41 eliminates the need for a display to be provided on the communication checker 35.

Although the communication checker in the above-described embodiments detects the communication states through the SLPR service and in the FOMA service, the present invention is not limited thereto; the communication checker can be adapted to detect the communication states through a plurality of any types of wireless services.

There exists a call-originating type slave unit that transmits data by itself in its own cycle without reference to a master unit and a slave unit employing a master-unit centralized system that transmits the data in response to the instruction from the master unit. The slave unit according to the embodiment can be either one.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

What is claimed is:

1. A communication checker comprising:
a first detector for detecting the communication state in a first wireless communication method; and
a second detector for detecting the communication state in a second wireless communication method, said second wireless communication method being different from said first wireless communication method; wherein
said communication checker checks the communication state at a site where a master unit that communicates with a plurality of slave units and a management server is planned to be installed,
said master unit and said plurality of slave units communicate with each other in said first wireless communication method, while said master unit and said management server communicate with each other in said second wireless communication method,
said communication checker communicates with said plurality of slave units and said management server, and
said management server is provided separately from said plurality of slave units.

2. The communication checker according to claim 1, wherein
said first wireless communication method is the specified low power radio service, and said second wireless communication method is a wireless service using a cellular phone communication network.

3. The communication checker according to claim 1, wherein
said communication checker is incorporated in said master unit.

4. The communication checker according to claim 1, further comprising
an automatic communication-state checker for automatically checking the communication states and manners with said plurality of slave units and said management server.

5. The communication checker according to claim 1, wherein said communication checker checks the communication state by measuring an electric field strength of radio waves emitted by each of said plurality of slave units.

6. The communication checker according to claim 1, wherein said communication checker checks the communication state by transmitting an inquiry signal each of said plurality of slave units, and determining whether or not responses are received from each of said plurality of slave units based on said inquiry signal.

7. A communication-state detection system using a communication checker having a first detector for detecting the communication state in a first wireless communication method and a second detector for detecting the communication state in a second wireless communication method, said second wireless communication method being different from said first wireless communication method, wherein said communication checker checks the communication state at a site where a master unit that communicates with a plurality of slave units and a management server is planned to be installed, said master unit and said plurality of slave units communicate with each other in said first wireless communication method, while said master unit and said management server communicate with each other in said second wireless communication method, and wherein said management server stores the communication states which are detected by said communication checker, between said plurality of slave units and said master unit communicating in said first wireless communication method, said communication-state detection system comprising:

a network accessible via said second wireless communication method; and a mobile terminal accessible to said network, wherein said mobile terminal can access to said management server via said network to check the communication states between said plurality of slave units and said master unit communicating in said first wireless communication method, wherein said communication checker communicates with said plurality of slave units and said management server, and wherein said management server is provided separately from said plurality of slave units.

8. The communication-state detection system according to claim 7, wherein said communication checker detects only the communication state in said first wireless communication method and said second wireless communication method, and said mobile terminal has a display to display the communication state in said first wireless communication method and said second wireless communication method.

9. A method for checking communication states at a site where a master unit communicating with a plurality of slave units and a management server is planned to be installed, the method comprising the steps of:

detecting the communication state with the slave units in a first wireless communication method by a communication checker at a site where said master unit is planned to be installed;

detecting the communication state with said management server in a second wireless communication method by said communication checker at a site where said master unit is planned to be installed, said second wireless communication method being different from said first wireless communication method;

checking the communication state at a site where a master unit that communicates with a plurality of slave units and a management server is planned to be installed;

performing, by said master unit and said plurality of slave units, communication with each other in said first wireless communication method; and performing, by said master unit and said management server, communication with each other in said second wireless communication method, wherein said communication checker communicates with said plurality of slave units and said management server, and wherein said management server is provided separately from said plurality of slave units.

10. The method for checking communication states according to claim 9, further comprising the steps of:

storing the communication states between said plurality of slave units and master unit communicating in said first wireless communication method in said management server, the communication states being detected by said communication checker; and allowing a mobile terminal to access said management server via a network to check the communication states between said plurality of slave units and master unit communicating in said first wireless communication method.

11. The method according to claim 9, wherein said checking step comprises measuring an electric field strength of radio waves emitted by each of said plurality of slave units.

12. The method according to claim 9, wherein said checking step comprises:

transmitting an inquiry signal to each of said plurality of slave units; and determining whether or not responses are received from each of said plurality of slave units based on said inquiry signal.

* * * * *